(12) United States Patent
Miyamoto

(10) Patent No.: US 8,914,056 B2
(45) Date of Patent: Dec. 16, 2014

(54) MOBILE STATION DEVICE AND BASE STATION DEVICE FOR RADIO COMMUNICATION

(75) Inventor: Shoichi Miyamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1401 days.

(21) Appl. No.: 12/504,816

(22) Filed: Jul. 17, 2009

(65) Prior Publication Data

US 2010/0029321 A1 Feb. 4, 2010

(30) Foreign Application Priority Data

Jul. 30, 2008 (JP) .................................. 2008-196376

(51) Int. Cl.
| | |
|---|---|
| H04B 7/00 | (2006.01) |
| H04W 52/36 | (2009.01) |
| H04W 52/44 | (2009.01) |
| H04W 52/28 | (2009.01) |

(52) U.S. Cl.
CPC .......... *H04W 52/365* (2013.01); *H04W 52/282* (2013.01); *H04W 52/44* (2013.01)
USPC ......... 455/522; 455/69; 455/13.4; 455/127.5; 455/67.11; 370/432; 370/318; 713/320

(58) Field of Classification Search
CPC . H04W 52/282; H04W 36/30; H04W 52/283; H04W 52/286; H04W 52/362; H04W 52/367; H04W 52/44
USPC ......... 455/522, 69, 13.4, 127.1–127.5, 67.11; 370/342, 432, 318; 713/320
See application file for complete search history.

(56) References Cited

U.S. PATENT DOCUMENTS

| | | | |
|---|---|---|---|
| 2003/0207696 A1* | 11/2003 | Willenegger et al. | 455/522 |
| 2004/0097253 A1* | 5/2004 | Malkamaki | 455/522 |
| 2004/0203992 A1 | 10/2004 | Yun | |

(Continued)

FOREIGN PATENT DOCUMENTS

| | | |
|---|---|---|
| EP | 1 045 528 | 10/2000 |
| EP | 1 133 079 | 9/2001 |

(Continued)

OTHER PUBLICATIONS

Notification of Reasons for Refusal dated Jun. 19, 2012 from the corresponding Japanese Application No. 2008-196376 with partial translation.

(Continued)

*Primary Examiner* — Shaima Q Aminzay
(74) *Attorney, Agent, or Firm* — Katten Muchin Rosenman LLP

(57) ABSTRACT

A mobile station device includes a receiving section configured to receive a control signal used for changing a value of the transmission power of the mobile station device from a base station, and a control section configured to change, if the transmission power value of the mobile station device is more than a certain threshold value when the control signal has been received, the transmission power value by setting an extent to which the transmission power value is to be changed as a certain extent of change, and, if the transmission power value of the radio mobile station device is less than the certain threshold value when the receiving section received, change the transmission power value by making the extent of change of the transmission power value smaller than the certain extent of change.

13 Claims, 15 Drawing Sheets

(56) References Cited

U.S. PATENT DOCUMENTS

| | | |
|---|---|---|
| 2005/0124373 A1 | 6/2005 | Marinier |
| 2005/0239409 A1* | 10/2005 | Oh et al. .................... 455/67.11 |
| 2006/0252450 A1 | 11/2006 | Wigard et al. |
| 2007/0030829 A1 | 2/2007 | Vimpari et al. |
| 2007/0077956 A1* | 4/2007 | Julian et al. ................... 455/522 |
| 2008/0080465 A1* | 4/2008 | Pajukoski et al. ............. 370/342 |

FOREIGN PATENT DOCUMENTS

| | | |
|---|---|---|
| JP | 8-32513 | 2/1996 |
| JP | 10-242905 | 9/1998 |
| JP | 2002-152060 | 5/2002 |
| JP | 2003-324382 | 11/2003 |
| JP | 2003-324385 | 11/2003 |
| JP | 2007-97055 | 4/2007 |
| JP | 2008-541535 | 11/2008 |
| WO | 00/42717 | 7/2000 |
| WO | 2006-117663 | 11/2006 |

OTHER PUBLICATIONS

European Search Report dated Jul. 24, 2013, from corresponding European Application No. 09166258.5-1855.

* cited by examiner

MOBILE STATION DEVICE AND BASE STATION DEVICE FOR RADIO COMMUNICATION

CROSS-REFERENCE TO RELATED APPLICATIONS

This application is based upon and claims the benefit of priority of the prior Japanese Patent Application No. 2008-196376, filed on Jul. 30, 2008, the entire contents of which are incorporated herein by reference.

FIELD

The present invention relates to a mobile station device and a base station device for radio communication which perform Transmission Power Control.

BACKGROUND

Transmission Power Control (TPC) in a mobile communication system is performed in order to attain a reduction of interference in one's own cell and another cell together with a reduction of battery consumption of a terminal device, that is, to attain maintenance of the quality of communication together with a reduction of transmission power. As examples of Transmission Power Control, Open Loop Transmission Power Control that determines the initial transmission power obtained immediately after transmission is started, Closed Loop Transmission Power Control that changes the power in accordance with a change in the propagation environment thereof while communication is being performed, and Outer Loop Transmission Power Control that monitors the quality of communication to make a power control threshold value used in closed loop transmission variable are given.

In Closed Loop Transmission Power Control, the power is varied in units of frames for a certain radio duration. In the front of and in the rear of a boundary between one frame and an adjacent frame where a difference in power is generated, transient-responsive influence is observed. Thus, in Closed Loop Transmission Power Control, a method of setting a duration (hereinafter, referred to as a transition duration), which does not involve data transmission at a head part or a terminal part of a frame, is used. Incidentally, in many systems, setting of a transition duration is determined not only depending on the transient-responsive influence but also depending on composite factors such as a Multi-Path model (for example, a Delay Path length and the number of paths) used and the influence on radio characteristics and data transmission efficiency. (For example, see Japanese Laid-Open Patent Publication No. 2003-324385 and Japanese Laid-Open Patent Publication No. 2003-324382).

In general, a mobile station device used in mobile communication is of a battery-driven type and hence it is desirable for the mobile station device to reduce power consumption. It is also desirable for the mobile station device to be configured to cope with high transmission power in order to maintain the quality of communication. Thus, in many cases, the dynamic range of the transmission power is set higher than 60 to 70 dB. The behavior of transient response observed when the transmission power is increased starting from a state in which the transmission power of a mobile station device is low or is reduced to zero is different from that observed when the transmission power is increased or changed starting from a state in which a certain measure of the transmission power is being transmitted. The influence may be greater exerted on a response waveform and spectrum when the transmission power is increased starting from a state in which the transmission power is low or is reduced to zero than when the transmission power is increased or changed starting from a state that the transmission power is high.

In conventional Transmission Power Control, in some cases, a change in response due to a difference in transmission power is not taken into consideration and hence, in these cases, the radio characteristics are adversely affected by fluctuations of the transmission power. When a change in response due to the difference in transmission power has been taken into consideration, since the transition duration of a radio frame has been conventionally fixed, such processing is performed so that the transition duration is made slightly longer than needed. However, such elongation may be disadvantageous from the viewpoint of data transmission efficiency.

SUMMARY

According to an aspect of the invention, a mobile station device includes a receiving section configured to receive a control signal used for changing a value of the transmission power of the mobile station device from a base station, and a control section configured to change, if the transmission power value of the mobile station device is more than a certain threshold value when the control signal has been received, the transmission power value by setting an extent to which the transmission power value is to be changed as a certain extent of change, and, if the transmission power value of the radio mobile station device is less than the certain threshold value when the receiving section received, change the transmission power value by making the extent of change of the transmission power value smaller than the certain extent of change.

According to an aspect of the invention, a base station device includes a receiving section configured to receive, from a mobile station which is communicating with the base station device, a request that a non-data-transmission duration be of a certain length in uplink transmission; a control section configured to set the non-data-transmission duration in uplink transmission requested from the mobile station device; and a transmitting section configured to transmit a response to the request to the mobile station device.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments will be described with reference to the accompanying drawings. Note that configurations of the embodiments are merely examples and not limited by configurations of the embodiments of the present invention.

In the embodiments, a mobile station device may be referred to as a mobile station and a base station device may be referred to as a base station.

(Configurations)

Figure 1:
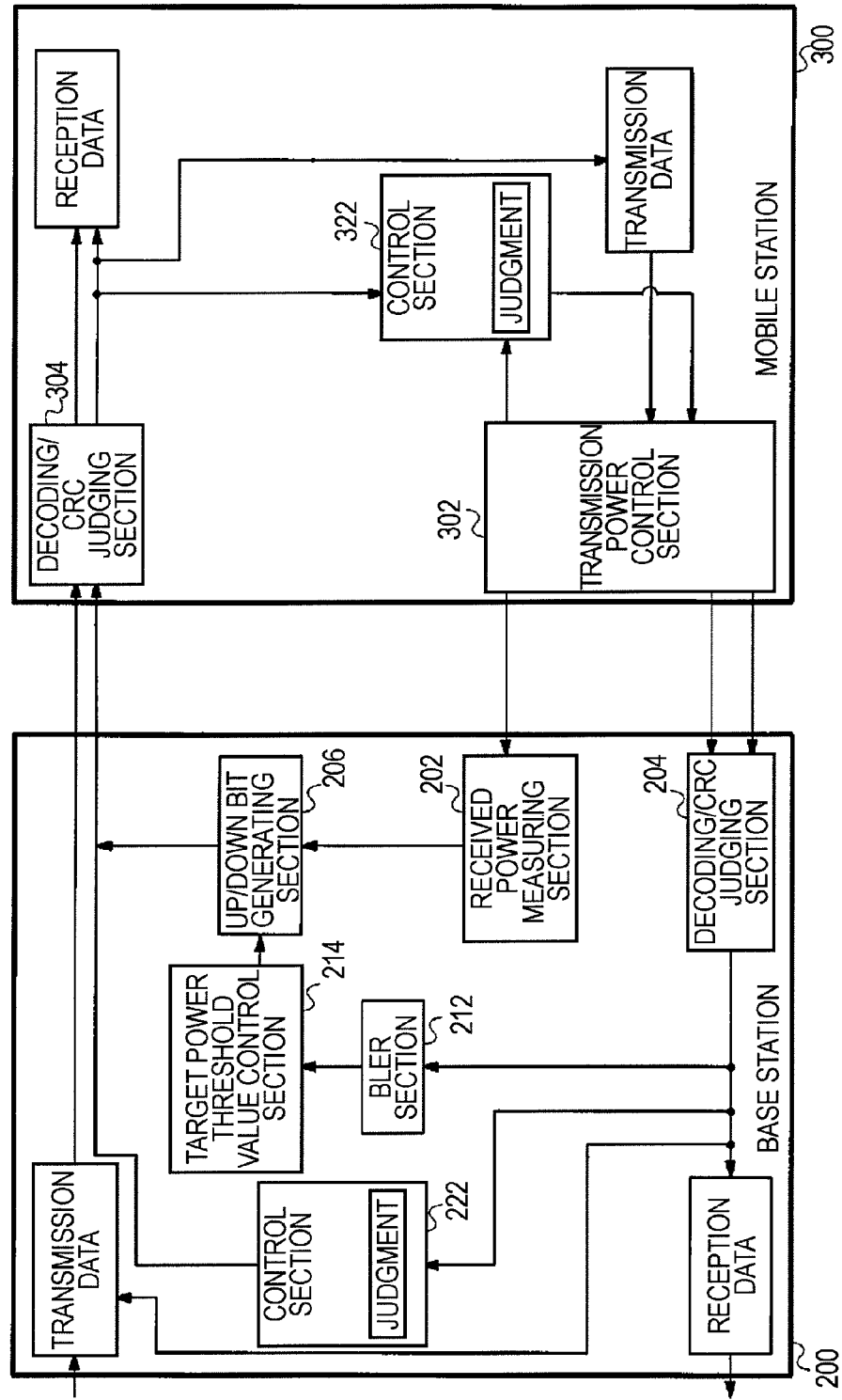
FIG. 1 is a diagram illustrating configurations of a base station and a mobile station.

FIG. 1 is a diagram illustrating an example of configurations of a base station and a mobile station.

A base station (for example, eNB: evolved Node B) 200 includes a received power measuring section 202, a decoding/CRC (Cyclic Redundancy Check) judging section 204, an Up/Down Bit generation section 206, a BLER (Block Error Rate) section 212, a target power threshold value control section 214, and a control section 222. A mobile station (for example, UE: User Equipment) 300 includes a transmission power control section 302, a decoding/CRC judging section 304, and a control section 322. A given number of a plurality of the above mentioned processing sections may be united into one processing section, and a given one of the above mentioned processing sections may be configured to perform a process to be originally performed using a plurality of processing sections. Each of the above mentioned processing sections may be implemented in the form of either hardware or software.

The base station is connected to a higher-order network and the base station is in radio-communication with the mobile station.

(Base Station)

The received power measuring section 202 receives a signal of a Pilot Channel (Pilot CH) transmitted from the mobile station 300, and measures the received power of the received Pilot Channel and informs the Up/Down Bit generation part 206 of the measured received power.

The decoding/CRC judging section 204 receives a UL-SCH (Uplink Shared Channel) signal and a UL-L1L2CCH (Uplink L1 L2 Control Channel) signal. The UL-L1L2CCH signal includes information such as Transition Duration, Uplink transmission power (UL-POW: Uplink Power), and DL-ACK/NACK (Downlink Acknowledge/Negative Acknowledge). The decoding/CRC judging section 204 decodes a signal received from the mobile station 300 and performs CRC (Cyclic Redundancy Check) of the decoded data in units of frames to judge whether or not there is an error in communication data in a frame. The decoding/CRC judging section 204 is capable of operating so as not to include a signal of Transition Duration in objects to be decoded.

The Up/Down Bit generation section 206 receives a target power threshold value relating to a value of the received power from the mobile station 300, from the target power threshold value control section 214 and also receives a value of the received power of the Pilot Channel from the mobile station 300, from the received power measuring section 202. Then, the Up/Down Bit generation section 206 compares the target power threshold value with the received power value and generates an Up Bit or a Down Bit as a TPC Bit such that the received power value comes closer to the target power threshold value. The TPC Bit is sent to the mobile station 300 to be used to control a value of the transmission power of the mobile station 300. When the Up Bit is received, the mobile station 300 increases its transmission power value. On the other hand, when the Down Bit is received, the mobile station 300 decreases its transmission power value. As an alternative, the Up/Down Bit generation 206 may use information such as a received SIR (Signal-to-Interference power Ratio) as a material used for judgment in place of the received power value to generate an Up Bit or a Down Bit.

The BLER section 212 measures a BLER (Block Error Rate) of a signal received from the mobile station 300 and informs the target power threshold value control section 214 of the measured BLER.

The target power threshold value control section 214 sets a target power threshold value for the received power value from the mobile station 300 based on the BLER informed from the BLER section 212. For example, when the BLER is high, the target power threshold value is set higher than a currently set value, while when the BLER is low, the target power threshold value is set lower than the currently set value.

The control section 222 receives information on Transition Duration and information on Uplink transmission power from the mobile station 300. The control section 222 is capable of judging whether there exists a Transition Duration and whether a Transition Duration is to be added. Information on a judgment result and the like is transmitted to the mobile station 300 over a control channel.

(Mobile Station)

The transmission power control section 302 controls Uplink transmission power to be transmitted to the base station 200. The transmission power control section 302 transmits information such as Transition Duration, Uplink transmission power, and UL-ACK/NACK (Uplink Acknowledge/Negative Acknowledge) to the base station 200. The transmission power control section 302 controls the Uplink transmission power and the Transition Duration based on the information from the control section 322 and informs the control section 322 of a value of the Uplink transmission power (UL POW: Uplink Power).

The decoding/CRC judging section 304 receives a DL-SCH (Downlink Shared Channel) signal and a DL-L1L2CCH (Downlink L1 L2 Control Channel) signal. The DL-L1L2 CCH (Downlink L1 L2 Control Channel) signal includes information such as Transition Duration, Uplink transmission power, and UL-ACK/NACK.

The control section 322 receives the TPC Bit including the Up Bit or the Down Bit from the base station 200. The control section 322 also receives the Uplink transmission power from the transmission power control section 302. The control section 322 is capable of obtaining information on the speed of the mobile station 300. The speed information may be obtained based on, for example, the time differential of position information obtained using a GPS (Global Positioning System) function installed in the mobile station 300, the time integral of a measured value of the acceleration of the mobile station 300 measured using an acceleration sensor installed therein, and a difference in the intensity of received power or received waves. As an alternative, the speed information may be obtained from the base station 200. The control section 322 judges whether the Uplink transmission power is to be increased, the extent to which the Uplink transmission power is to be changed such as the extent to which the transmission power is to be increased or decreased (hereinafter, referred to as an extent of change such as an extent of increase or decrease of the Uplink transmission power), and a length of a Transition Duration, and informs the transmission power control part 302 of the judgment result.

The mobile station 300 may be configured to have a GPS function used to obtain the position information and an acceleration sensor that measures the acceleration of the mobile station 300. The control section 322 of the mobile station 300 is capable of processing the position information obtained using the GPS function and the acceleration information obtained using the acceleration sensor.

(Transmission Power Control)

In Transmission Power Control (TPC) systems, Closed Loop Transmission Power Control is a system capable of increasing and decreasing the transmission power, in general, in each TPC update cycle.

In a general Closed Loop Transmission Power Control system, the base station 200 receives UP-Link transmission data from the mobile station 300 in Up-link transmission.

The base station 200 measures SIR (Signal-to-Interference power Ratio) from a Pilot Channel (Pilot CH) included in the Up-link transmission data and compares the measured ratio with a certain threshold value used for Closed Loop Transmission Power Control. The certain threshold value is set using the target power threshold value control section 214. As a result of comparison, for example, if the received SIR is more than or equal to the threshold value, the base station 200 transmits a Down Bit as the TPC Bit to the mobile station 300, while if the received SIR is less than the threshold value, the base station 200 transmits an Up Bit as the TPC Bit to the mobile station 300. As an alternative, the base station 200 may use a value of the received power as the target power threshold value in place of the received SIR.

The mobile station 300, which has received the TPC Bit which is the Down Bit or the Up Bit, increases or decreases the transmission power as specified. The Closed Loop Transmission Power Control is performed in order to maintain the quality of the received SIR while adapting to a sudden change in propagation environment. Thus, in Closed Loop Transmission Power Control, typically, the transmission power may be changed in units of radio frames (for example, Sub-frames).

(Transition Duration)

Figure 2:
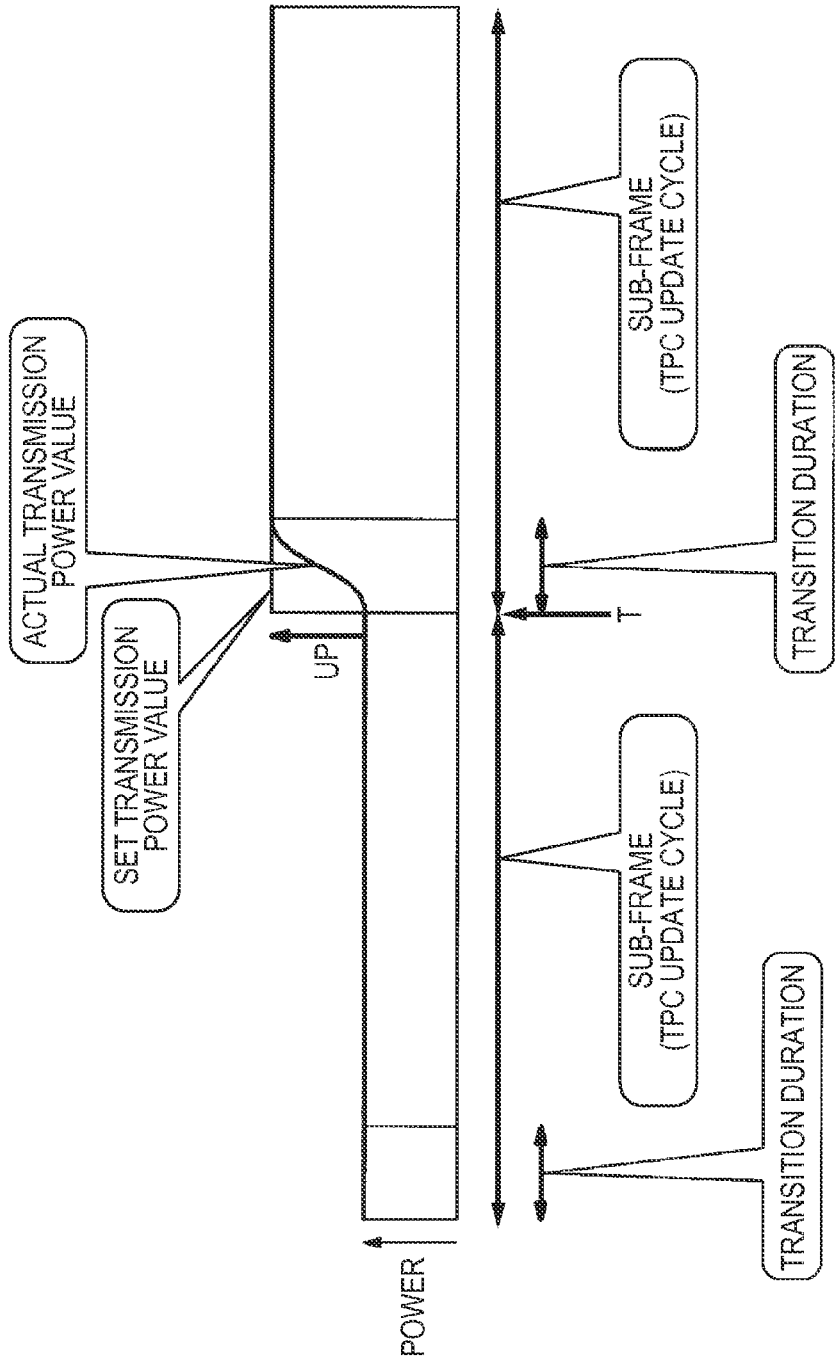
FIG. 2 illustrates an example of a relation among radio frames, transmission power, and Transition Durations.

FIG. 2 is a diagram illustrating an example of a relation among radio frames, transmission power, and Transition Durations. In FIG. 2, the horizontal axis indicates time and the vertical axis indicates transmission power of a mobile station. Transmission Power Control (TPC) is performed in units of radio frames (or Sub-frames).

As illustrated in FIG. 2, up to a time T, a set value of the transmission power of the mobile station 300 coincides with the actual value of the transmission power of the mobile station 300. It is assumed that the set value of the transmission power of the mobile station 300 is increased at the time T. However, the actual transmission power value obtained immediately after the set value of the transmission power has been increased may not be able to immediately catch up with the set value due to the influence of transient response. Once the influence of the transient response occurs, the received quality of a radio frame is adversely affected. In order to avoid the influence of the transient response, a Transition Duration is set at the head of the radio frame (or Sub-frame).

The transmission side does not to incorporate user data into the Transition Duration and the reception side is does not to include the Transition Duration in demodulation. The reason lies in that if the user data is incorporated into the Transition Duration, the quality of the user data will be deteriorated. As an alternative, the Transition Duration may be set at the end of the Sub-frame. The Transition Duration is set in order to cope with a sudden change in the power. If the absolute value of the transmission power value is large, an RF (Radio Frequency) unit of the mobile station 300 may be readily stabilized. The RF unit is a component related to radio communication of the mobile station 300.

Figure 3:
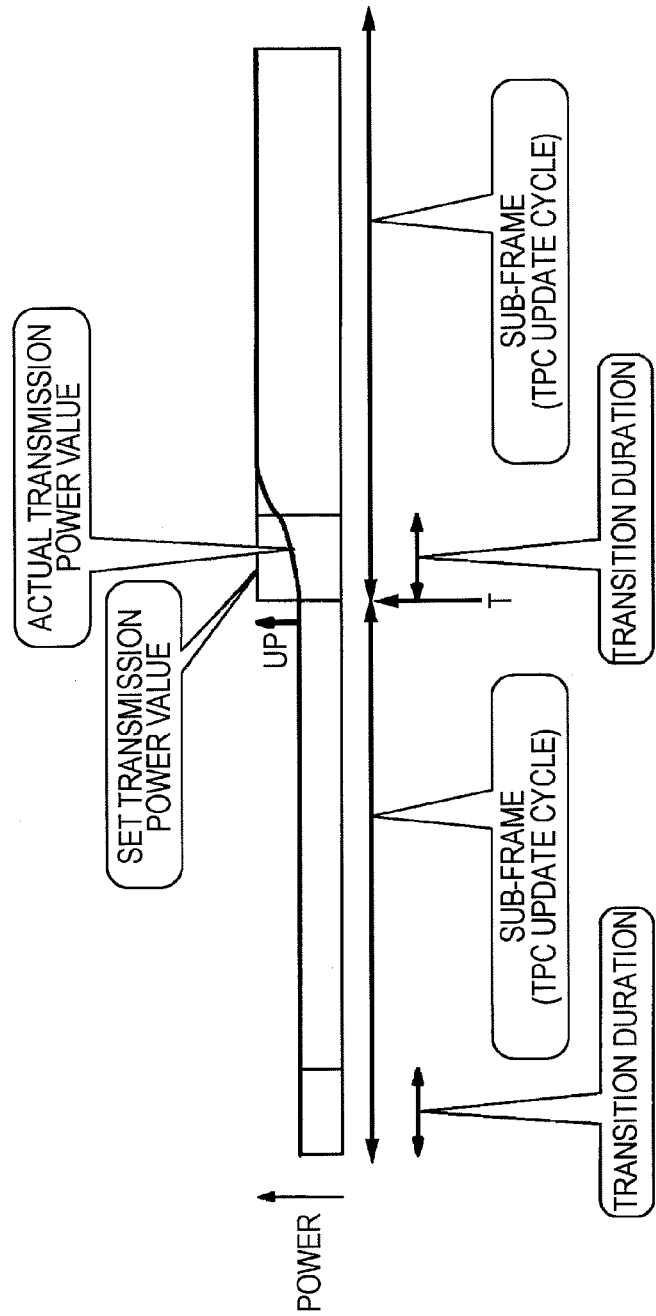
FIG. 3 illustrates another example of the relation among radio frames, transmission power, and Transition Durations.

FIG. 3 is a diagram illustrating another example of the relation among radio frames, transmission power, and Transition Durations. In FIG. 3, the horizontal axis indicates time and the vertical axis indicates transmission power of a mobile station.

In the example illustrated in FIG. 3, the transmission power is lower than that in the example illustrated in FIG. 2. In this case, when a set value the transmission power is increased at a time T, the actual transmission power may not be able to catch up with the increased set value even in the Transition Duration. If the situation mentioned above occurs, the user data obtained immediately after passing through the Transition Duration may be deteriorated. Thus, the mobile station is capable of preventing the user data from being adversely affected due to the transient response by adjusting the amount of change of the transmission power and the length of the Transition Duration. If the Transition Duration is lengthened, the area used to transmit effective signals will be reduced and hence the data transmission efficiency will be reduced. On the other hand, if the Transition Duration is shortened more than needed, the quality of communication may be deteriorated due to the transient response.

(Examples of Methods of Adjusting the Amount of Change of the Transmission Power and Transition Duration)

As methods of reducing the influence of the transient response on the radio characteristics in Transmission Power Control, a method of adjusting the amount of change or the extent of change of the transmission power and a method of adjusting the Transition Duration are provided.

(Example of Adjusting the Amount of Change of the Transmission Power)

Figure 4:
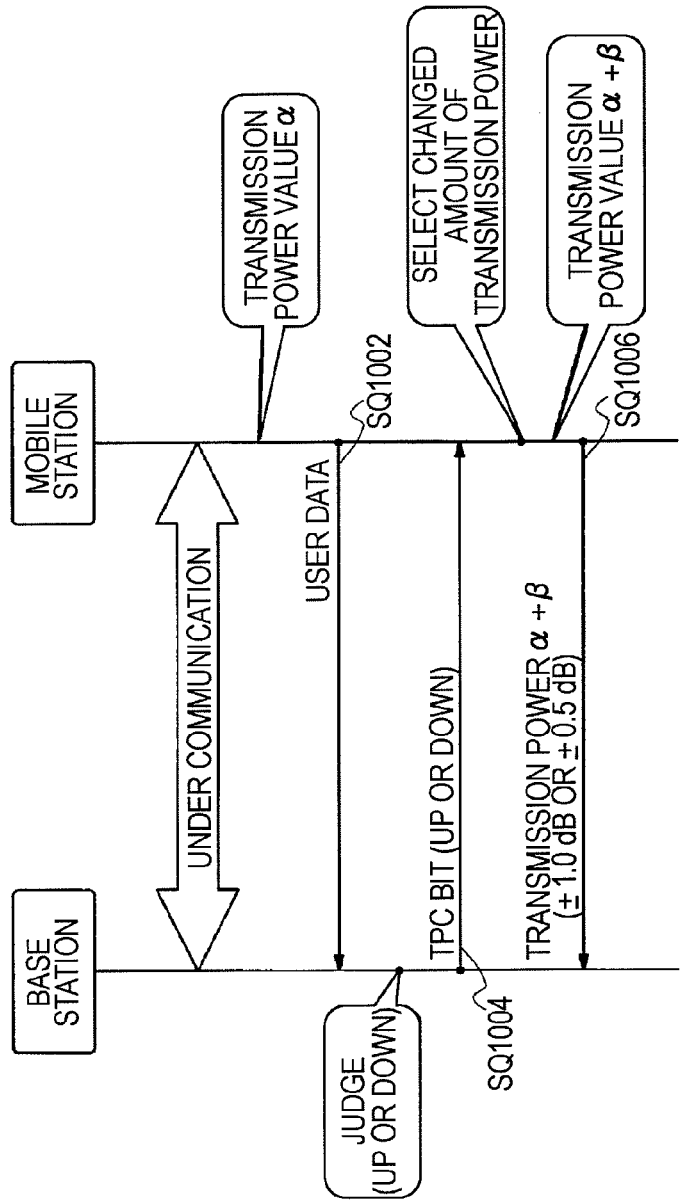
FIG. 4 illustrates an example of a sequence executed when an amount by which the transmission power is to be changed (hereinafter referred to as an "amount of change") is optionally changed in accordance with the transmission power on the side of a mobile station.

FIG. 4 is a diagram illustrating an example of a sequence executed when the amount of change of the transmission power is optionally changed in accordance with the transmission power on the side of a mobile station.

In the example illustrated in FIG. 4, it is assumed that the mobile station 300 is capable of optionally changing and selecting the amount of change of the transmission power independently of the base station in accordance with the level of the transmission power of the mobile station 300. While communication is being performed, the base station 200 receives Up-Link transmission data from the mobile station 300 to measure SIR or CQI (Channel Quality Indication) (SQ1002).

Then, in Closed Loop Transmission Power Control, the base station 200 compares the received power to a threshold value set for the transmission power for Closed Loop transmission and generates an Up Bit or a Down Bit to inform the mobile station 300 of a TPC Bit via Down Link (SQ1004).

After the TPC Bit has been received, the mobile station 300 confirms its transmission power value. In the example illustrated in FIG. 4, the transmission power value is designated by $\alpha$. If the transmission power value is less than a fixed transmission power value, the mobile station 300 changes its transmission power value based on a small amount of change $\beta 2$ (in the example illustrated in FIG. 4, 0.5 dB). If the transmission power value is more than or equal to the fixed transmission power value, the mobile station 300 changes its transmission power value based on a large amount of change $\beta 1$ (in the example illustrated in FIG. 4, 1.0 dB). The mobile station 300 performs Up-link transmission using the transmission power value changed in the above mentioned manner (SQ1006). As an alternative, two or more threshold values for the transmission power value may be set to set three or more amounts of change of the transmission power.

With adjustment of the amount of change of the transmission power described above, the influence of the transient response may be reduced if the transmission power value of the mobile station 300 is low.

(Transition Duration Adjusting Example 1)

Figure 5:
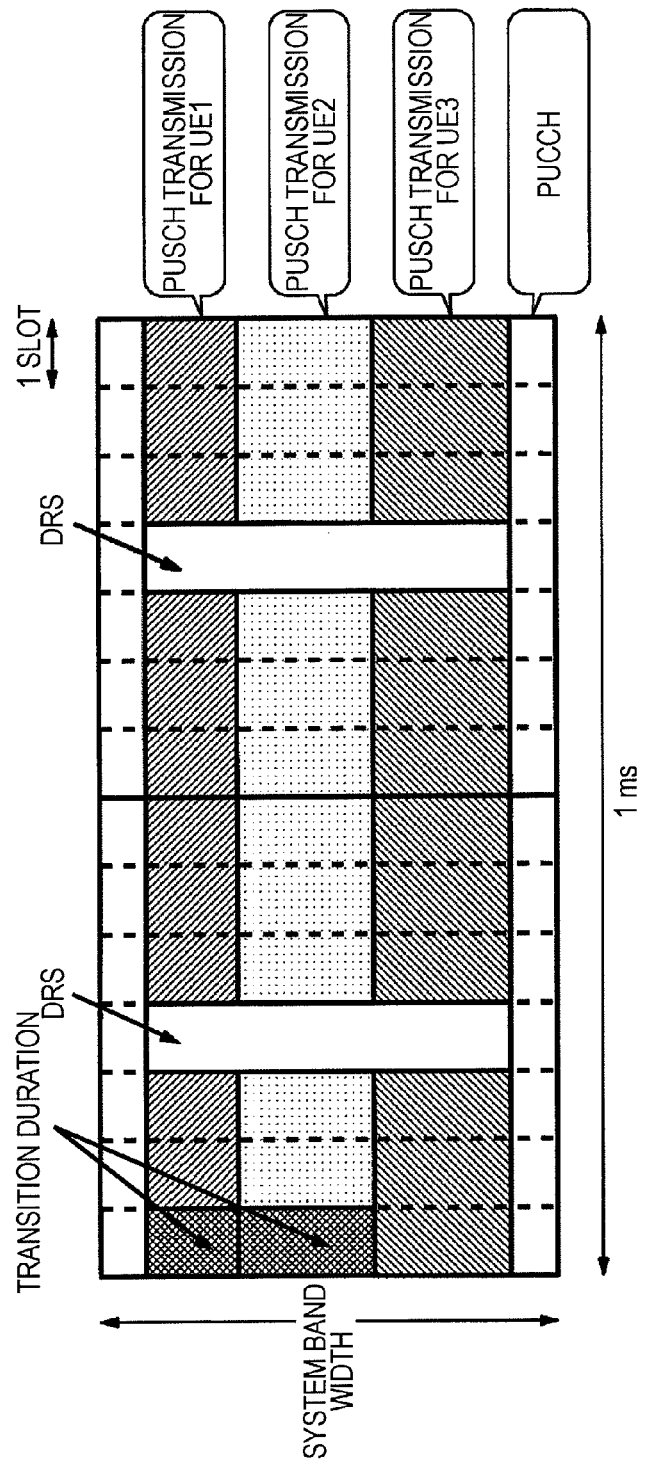
FIG. 5 illustrates an example of channel mapping used when whether a Transition Duration of a certain length is added or not is selected on the initiative of a base station in accordance with the transmission power on the side of a mobile station.
Figure 6:
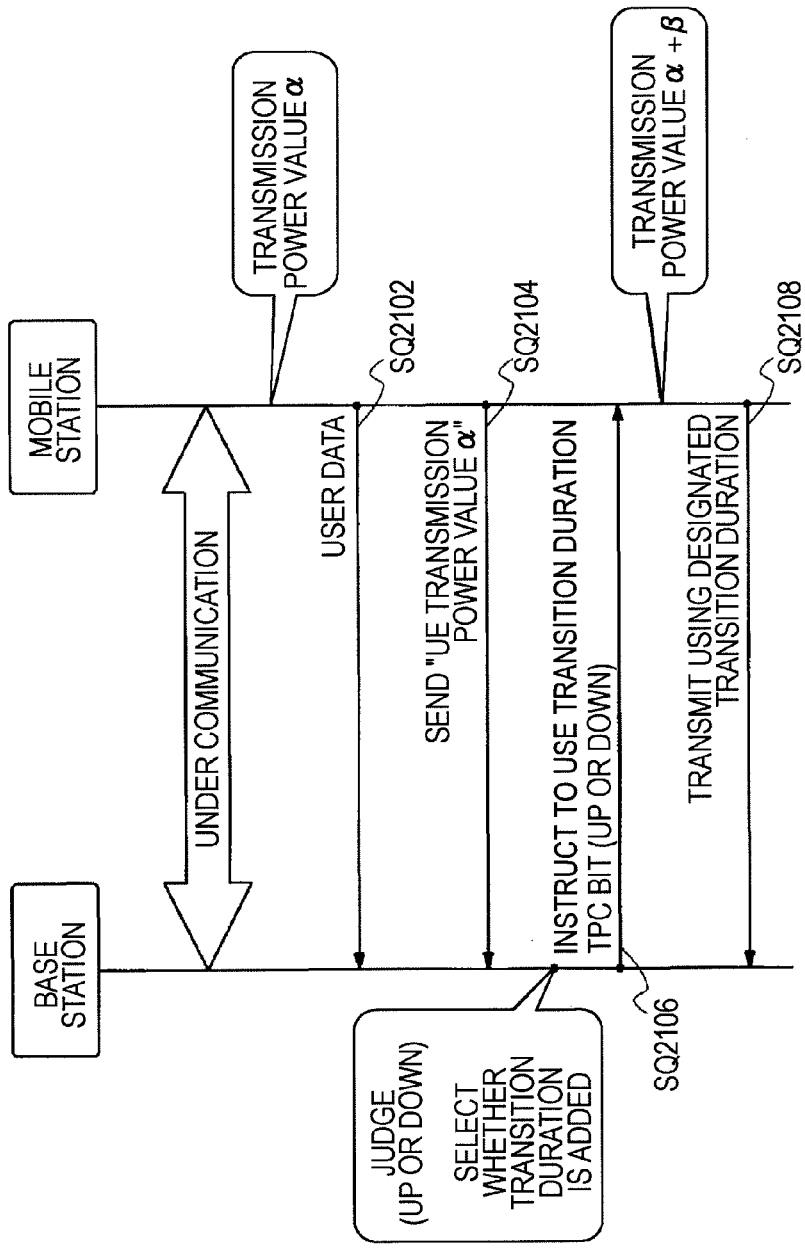
FIG. 6 illustrates an example of a sequence executed when whether a Transition Duration of a certain length is added or not is selected on the initiative of the base station in accordance with the transmission power on the side of the mobile station.

FIGS. 5 and 6 are diagrams illustrating an example in which whether a Transition Duration of a certain length is added or not is selected on the initiative of the base station in accordance with the transmission power on the side of a mobile station.

FIG. 5 is a diagram illustrating an example of channel mapping for the Up-link transmission in the above mentioned case. In FIG. 5, time is indicated horizontally and a system band width is indicated vertically. In the example illustrated in FIG. 5, the system band is allocated to a PUSCH (Physical Uplink Shared Channel) for a first mobile station (UE1), a PUSCH for a second mobile station (UE2), a PUSCH for a third mobile station UE3), and a PUCCH (Physical Uplink Control Channel). In the example illustrated in FIG. 5, it is supposed that the transmission power values of the first and second mobile stations are low and the transmission power value of the third mobile station is high and stable. Transition Durations are disposed in the PUSCHs of the first and second mobile stations.

FIG. 6 is a diagram illustrating an example of a sequence executed when whether the Transition Duration of the certain length is added or not is selected on the initiative of the base station in accordance with the transmission power value on the side of the mobile station.

In the example illustrated in FIG. 6, the base station 200 selects whether the Transition Duration of the certain length is added or not in accordance with the level of the transmission power of the mobile station 300. The base station 200 is in communication with the mobile station 300 and user data is being transmitted from the mobile station 300 to the base station 200 (SQ2102). The mobile station 300 transmits the transmission power information of the mobile station 300 to the base station 200 (SQ2104). The transmission power information includes the transmission power value of the mobile station 300.

The base station 200 compares the received transmission power information of the mobile station 300 with a threshold value, which is held therein, as a parameter. If the transmission power value of the mobile station 300 is less than the threshold value, the base station 200 selects a format to add the Transition Duration of the certain length and transmits the format together with a TPC Bit to the mobile station 300. If the transmission power value of the mobile station 300 is more than or equal to the threshold value or the transmission power value is not changed, the base station 200 selects a format for a Transition Duration of a usual length and informs the mobile station 300 of the format (SQ2106). The format is sent over the Control Channel.

The mobile station 300 generates a transmission frame for the Up-link transmission based on the format for the designated Transition Duration and transmits the frame to the base station (SQ2108).

(Transition Duration Adjusting Example 2)

Figure 7:
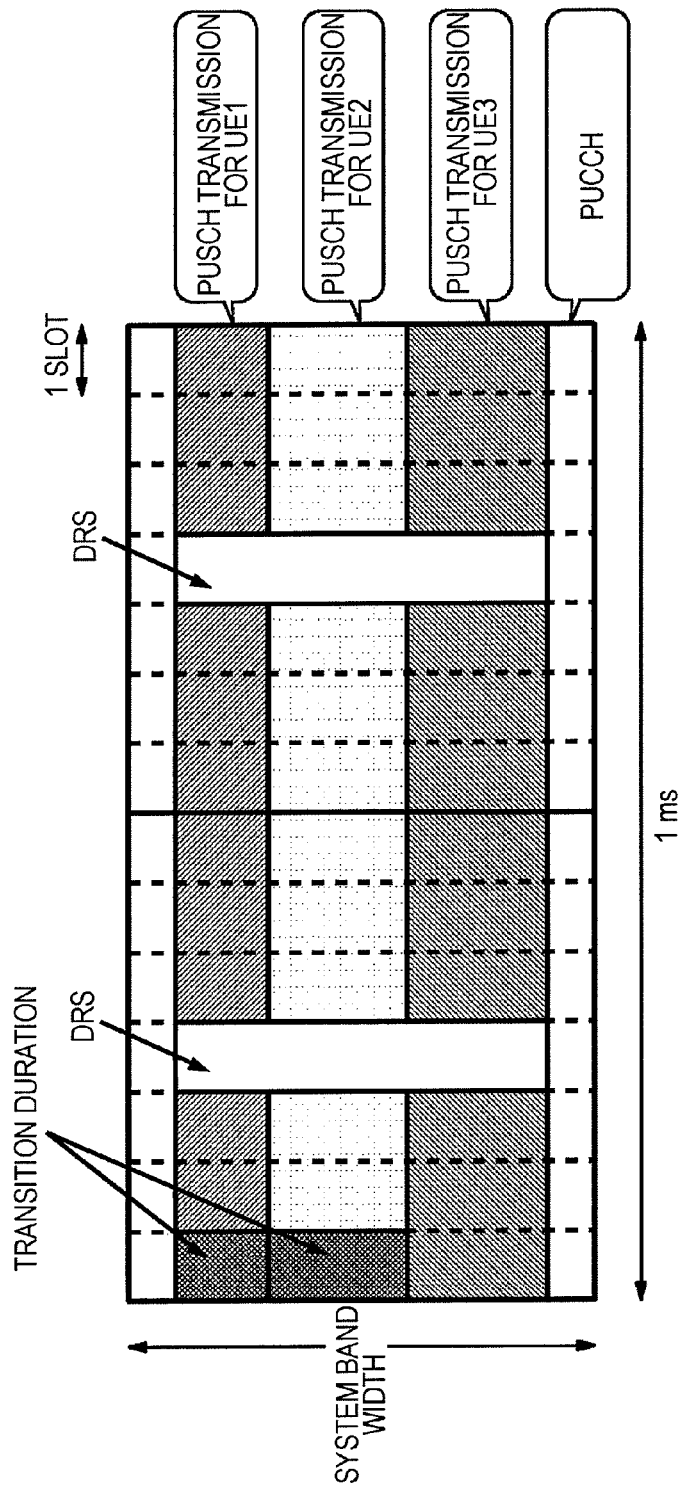
FIG. 7 illustrates an example of channel mapping used when whether a Transition Duration of a certain length is added or not is selected on the initiative of a mobile station in accordance with the transmission power on the side of the mobile station.
Figure 8:
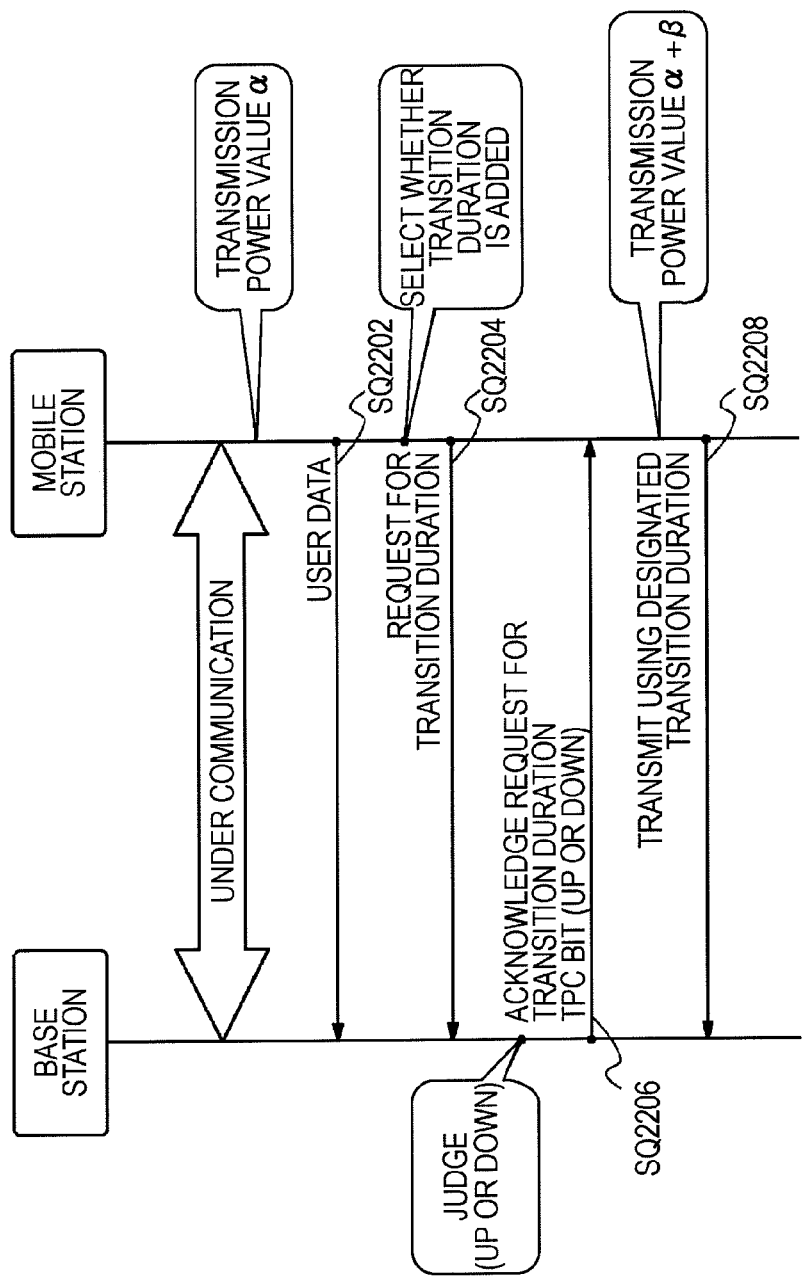
FIG. 8 illustrates an example of a sequence executed when whether a Transition Duration of a certain length is added or not is selected on the initiative of a mobile station in accordance with the transmission power on the side of the mobile station.

FIGS. 7 and 8 are diagrams illustrating an example in which whether a Transition Duration of a certain length is added or not is selected on the initiative of a mobile station in accordance with transmission power on the side of the mobile station.

FIG. 7 is a diagram illustrating an example of channel mapping for the Up-link transmission in the above mentioned case. In FIG. 7, time is indicated horizontally and a system band width is indicated vertically. In the example illustrated in FIG. 7, the system band is allocated to a PUSCH (Physical Uplink Shared Channel) for a first mobile station (UE1), a PUSCH for a second mobile station (UE2), a PUSCH for a third mobile station (UE3), and a PUCCH (Physical Uplink Control Channel). In the example illustrated in FIG. 7, it is assumed that the transmission power values of the first and second mobile stations are low and the transmission power value of the third mobile station is high and stable. Transition Durations are disposed in the PUSCHs of the first and second mobile stations.

FIG. 8 is a diagram illustrating an example of a sequence executed when whether the Transition Duration of the certain length is added or not is selected in accordance with the transmission power value on the side of the mobile station.

In the example illustrated in FIG. 8, the mobile station 300 requests the base station to select whether the Transition Duration of the certain length is added or not based on information on the transmission power of the mobile station 30. The base station 200 is in communication with the mobile station 300 and user data is being transmitted from the mobile station 300 to the base station 200 (SQ2202).

If the transmission power value of the mobile station 300 is less than a threshold value that the mobile station 300 holds therein as a parameter, the mobile station 300 transmits a result of the selection of a format to add the Transition Duration of the certain length to the base station 200. On the other hand, if the transmission power value of the mobile station 300 is more than or equal to the threshold value or the transmission power value is not changed, the mobile station 300 selects a format for a usual Transition Duration and transmits the selected format to the base station (SQ2204). In some cases, the format for the usual Transition Duration may not include a Transition Duration.

The base station 200 compares the received power with the transmission power threshold value, generates an Up Bit or a Down Bit, and transmits the TPC Bit to the mobile station 300 via Down Link. The base station 200 transmits a response (ACK) to the request for the Transition Duration from the mobile station 300 together with the TPC Bit to the mobile station 300 (SQ2206). The response may be transmitted over the Control Channel.

The mobile station 300 generates a transmission frame for the Up-Link transmission based on the designated format and transmits the frame to the base station (SQ2208).

(Transition Duration Adjusting Example 3)

Figure 9:
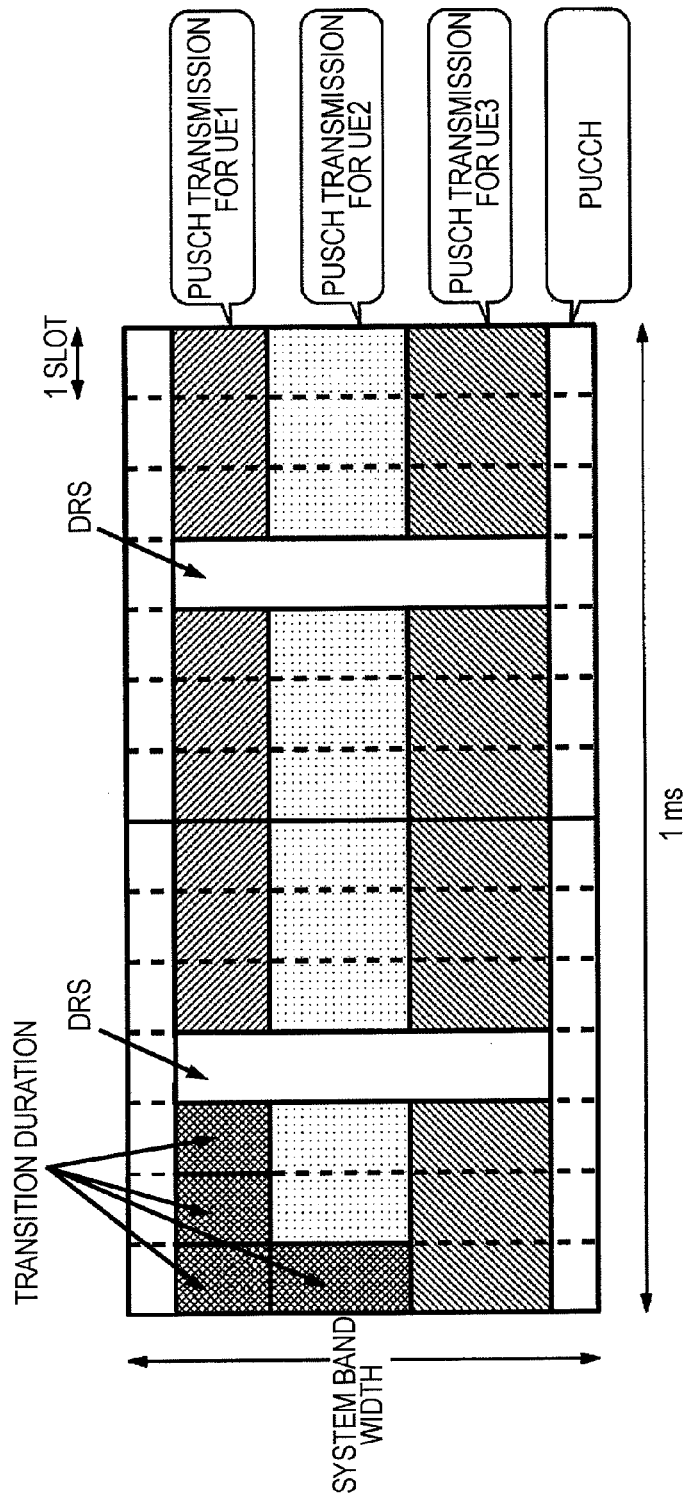
FIG. 9 illustrates an example of channel mapping used when a Transition Duration is selected on the initiative of a base station in accordance with the transmission power on the side of a mobile station.
Figure 10:
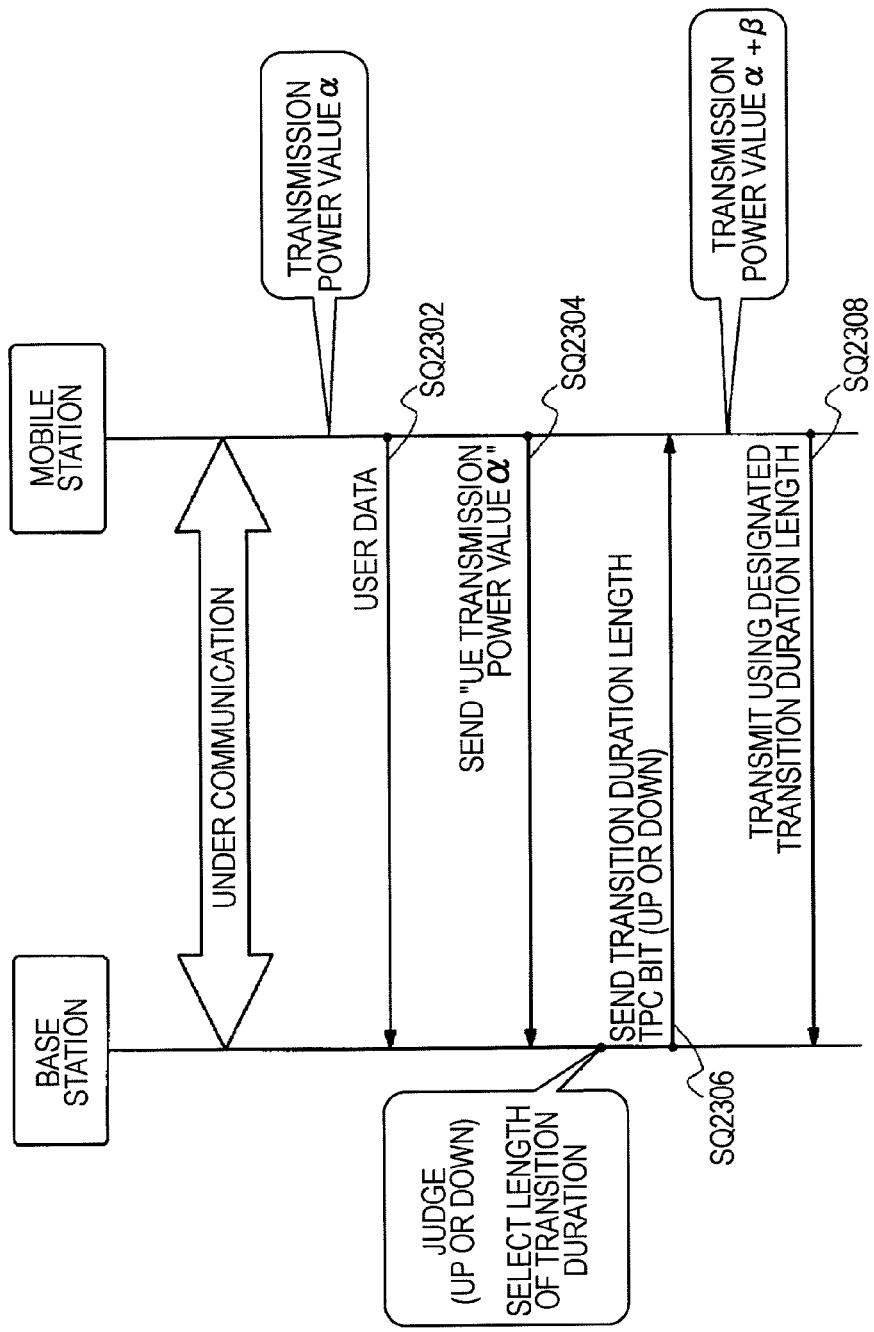
FIG. 10 illustrates an example of a sequence executed when a Transition Duration is selected on the initiative of the base station in accordance with the transmission power on the side of the mobile station.

FIGS. 9 and 10 are diagrams illustrating an example in which a Transition Duration is selected on the initiative of the base station in accordance with transmission power on the side of a mobile station.

FIG. 9 is a diagram illustrating an example of channel mapping for the Up-link transmission in the above mentioned case. In FIG. 9, time is indicated horizontally and a system band width is indicated vertically. In the example illustrated in FIG. 9, the system band is allocated to a PUSCH (Physical Uplink Shared Channel) for a first mobile station (UE1), a PUSCH for a second mobile station (UE2), a PUSCH for a third mobile station, and a PUCCH (Physical Uplink Control Channel). In the example illustrated in FIG. 9, it is assumed that the transmission power value of the first mobile station is low, the transmission power value of the second mobile station is higher than that of the first mobile station and is moderate, and the transmission power value of the third mobile station is higher than that of the second mobile station and is stable. Transition Durations are disposed in the PUSCHs of the first and second mobile stations.

FIG. 10 is a diagram illustrating an example of a sequence executed when the Transition Duration is selected on the initiative of the base station in accordance with the transmission power on the side of the mobile station.

In the example illustrated in FIG. 10, the base station 200 selects a Transition Duration of a certain length in accordance with the level of the transmission power of the mobile station 300. The base station 200 is in communication with the mobile station 300 and user data is being transmitted from the mobile station 300 to the base station 200 (SQ2302). The mobile station 300 transmits information on the transmission power of the mobile station 300 to the base station 200 (SQ2304). The transmission power information includes the transmission power value of the mobile station 300.

The base station 200 compares the received transmission power information of the mobile station 300 with a threshold value that the base station 200 holds therein as a parameter. If the transmission power information of the mobile station 300 is less than the threshold value (for example, the first mobile station in FIG. 9), the base station 200 selects a format to set the Transition Duration to have a length of, for example, three slots and informs the mobile station of the format together with a TPC Bit. On the other hand, if the transmission power value of the mobile station is more than or equal to the threshold value or is not changed (for example, the second mobile station in FIG. 9), the base station 200 selects a format to set the Transition Duration to have a length of one slot and transmits the format to the mobile station 300 (SQ2306).

The mobile station 300 generates a transmission frame for the Up-Link transmission based on the designated format and transmits the frame to the base station.

Here, an example in which two Transition Durations of lengths of three slots and one slot are selected has been described. As an alternative, the length of the Transition Duration may be finely varied by setting a plurality of threshold values used for comparison with transmission power values.

(Transition Duration Adjusting Example 4)

Figure 11:
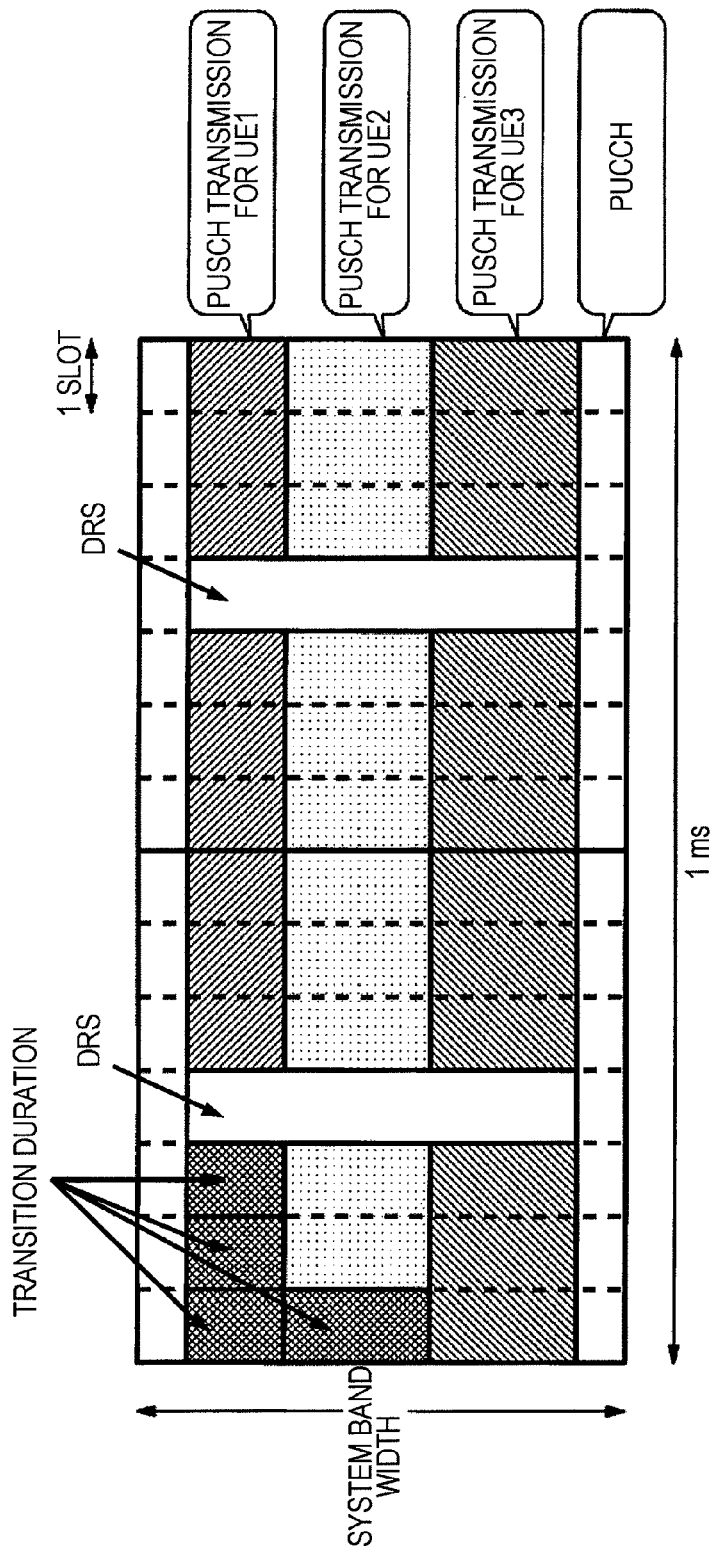
FIG. 11 illustrates an example of channel mapping used when a Transition Duration is selected on the initiative of a mobile station in accordance with the transmission power on the side of the mobile station.
Figure 12:
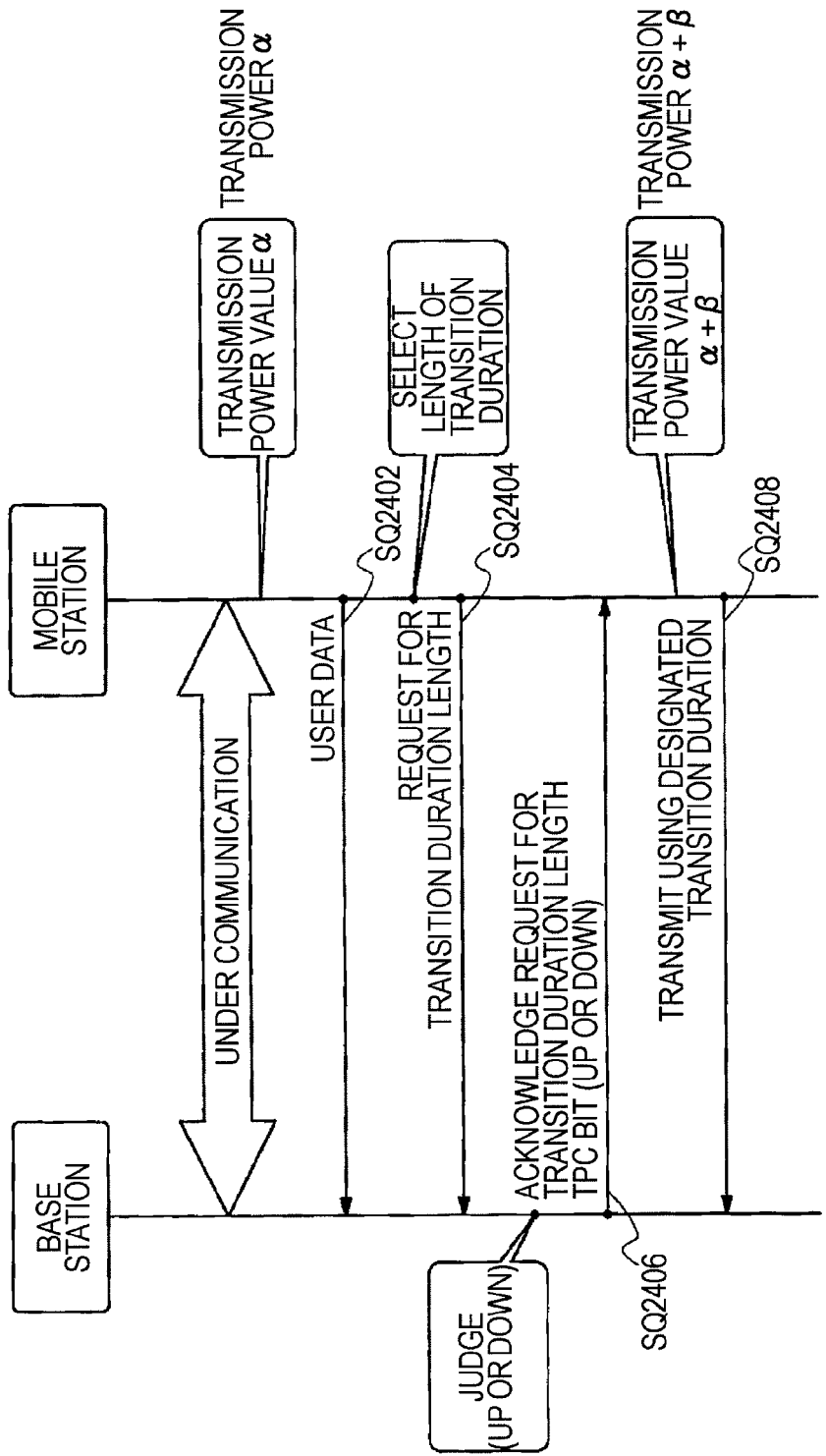
FIG. 12 illustrates an example of a sequence executed when a Transition Duration is selected on the initiative of the mobile station in accordance with the transmission power on the side of the mobile station.

FIGS. 11 and 12 are diagrams illustrating an example in which a Transition Duration is selected on the initiative of a mobile station in accordance with transmission power on the side of a mobile station.

FIG. 11 is a diagram illustrating an example of channel mapping for the Up-Link transmission in the above mentioned case. In FIG. 11, time is indicated horizontally and a system band width is indicated vertically. In the example illustrated in FIG. 11, the system band is allocated to a PUSCH (Physical Uplink Shared Channel) for a first mobile station (UE1), a PUSCH for a second mobile station (UE2), a PUSCH for a third mobile station, and a PUCCH (Physical Uplink Control Channel). In the example illustrated in FIG. 11, it is assumed that the transmission power value of the first mobile station is low, the transmission power value of the second mobile station is higher than that of the first mobile station and is moderate, and the transmission power value of the third mobile station is higher than that of the second mobile station and is stable. Transition Durations are disposed in the PUSCHs of the first and second mobile stations.

FIG. 12 is a diagram illustrating an example of a sequence executed when the Transition Duration is selected on the initiative of the mobile station in accordance with the transmission power on the side of the mobile station.

In the example illustrated in FIG. 12, the mobile station 300 requests the base station 200 for a Transition Duration of a certain length based on information on the transmission power of the mobile station itself. The base station 200 is in communication with the mobile station 300 and user data is being transmitted from the mobile station 300 to the base station 200 (SQ2402).

If the transmission power value of the mobile station 300 is less than a threshold value that the mobile station 300 holds therein as a parameter (for example, the first mobile station in FIG. 11), the mobile station 300 selects a format to set the Transition Duration to have a length of, for example, three slots and informs the base station 200 of the format. On the other hand, if the transmission power value of the mobile station 300 is less than the threshold value and is not changed (for example, the second mobile station in FIG. 11), the mobile station 300 selects a format to set the Transition Duration to have a length of, for example, one slot and transmits the format to the base station 200 (SQ2406).

The base station 200 transmits a response (ACK) to the request for the Transition Duration together with a TPC Bit to the mobile station 300 (SQ2406).

The mobile station 300 generates a transmission frame for the Up Link transmission based on the designated format and transmits the format to the base station (SQ2408).

Here, an example in which two Transition Durations of lengths of thee slots and one slot are selected has been described. As an alternative, the length of the Transition Duration may be finely varied by setting a plurality of threshold values used for comparison with transmission power values.

(Examples of Methods of Selecting the Method of Adjusting the Amount of Change of the Transmission Power and the Transition Duration Adjusting Methods)

Next, examples of methods of selecting the method of adjusting the amount of change of the transmission power and the transition duration adjusting methods will be described.

(Example of a Flowchart for Selection by Monitoring an UL-NACK)

Figure 13:
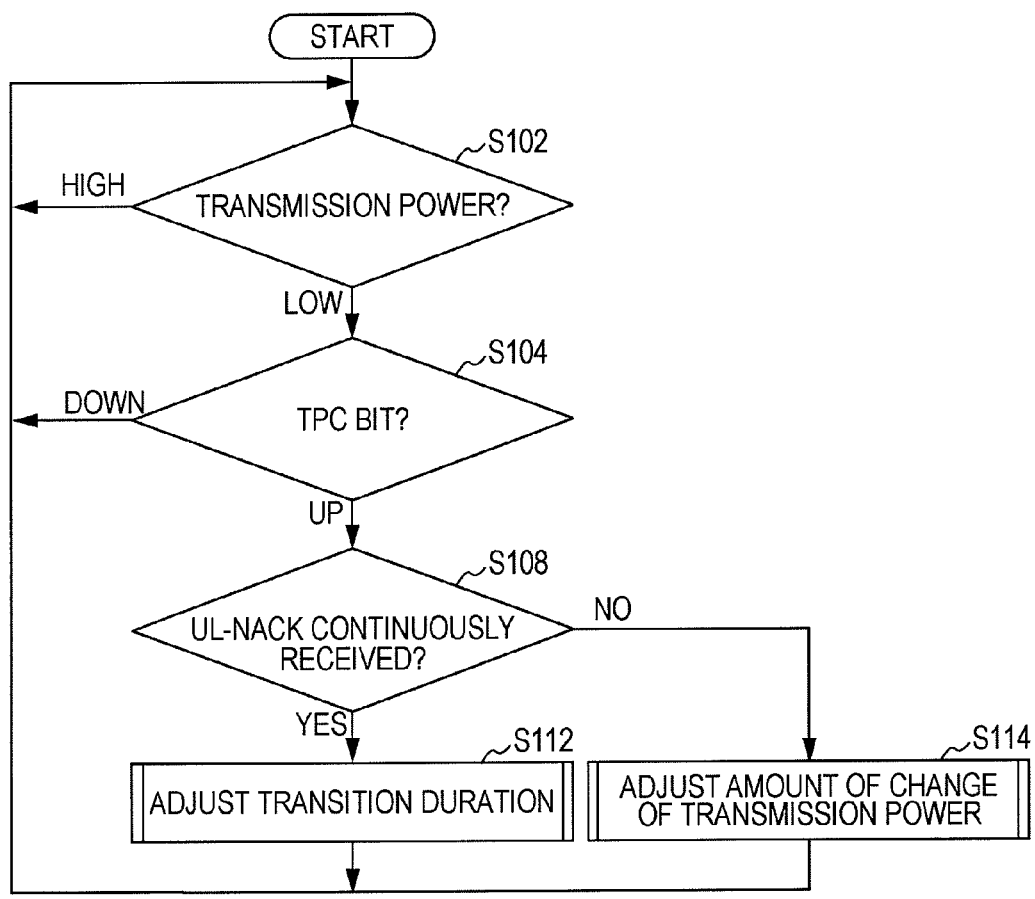
FIG. 13 illustrates an example of a flowchart for selection performed by monitoring an UL-NACK of a mobile station.

FIG. 13 is a diagram illustrating an example of a flowchart for selection performed by monitoring an UL-NACK of a mobile station.

The mobile station 300 compares its transmission power value with a previously set certain threshold value (S102). If the transmission power value of the mobile station 300 is less than the certain threshold value (S102; LOW), the mobile station 300 confirms a TPC Bit transmitted from the base station 200 (S104). If the TPC Bit is an Up Bit (S104; UP), the mobile station 300 confirms as to whether the UL-NACK has been continuously received a previously set certain number of times (S108).

The UL-NACK (Uplink Negative Acknowledge) is a response indicating that a signal, which has been transmitted from the mobile station 300 to the base station 200, has not been normally received by the base station 200. If the UL-NACK is continuously received by the mobile station 300, it is desirable to adjust the Transition Duration while keeping the amount of change of the transmission power large. The reason lies in that if the amount of change of the transmission power is decreased, it will become harder for the base station 200 to receive a signal in some cases.

If the UL-NACK has been continuously received the previously set certain number of times (S108; YES), the mobile station 300 adjusts the Transition Duration (S112). The Transition Duration may be adjusted in accordance with any one of the above mentioned Transition Duration adjusting examples 1 to 4.

If the UL-NACK has not been continuously received the previously set certain number of times (S108: NO), the mobile station 300 adjusts the amount of change of the transmission power (S114). The amount of change of the transmission power may be adjusted in accordance with the above mentioned examples of adjusting the amount of change of the transmission power.

Step S102 and step S104 may be eliminated as the case may be.

(Example of a Flowchart for Selection by Monitoring a Moving Speed of a Mobile Station)

Figure 14:
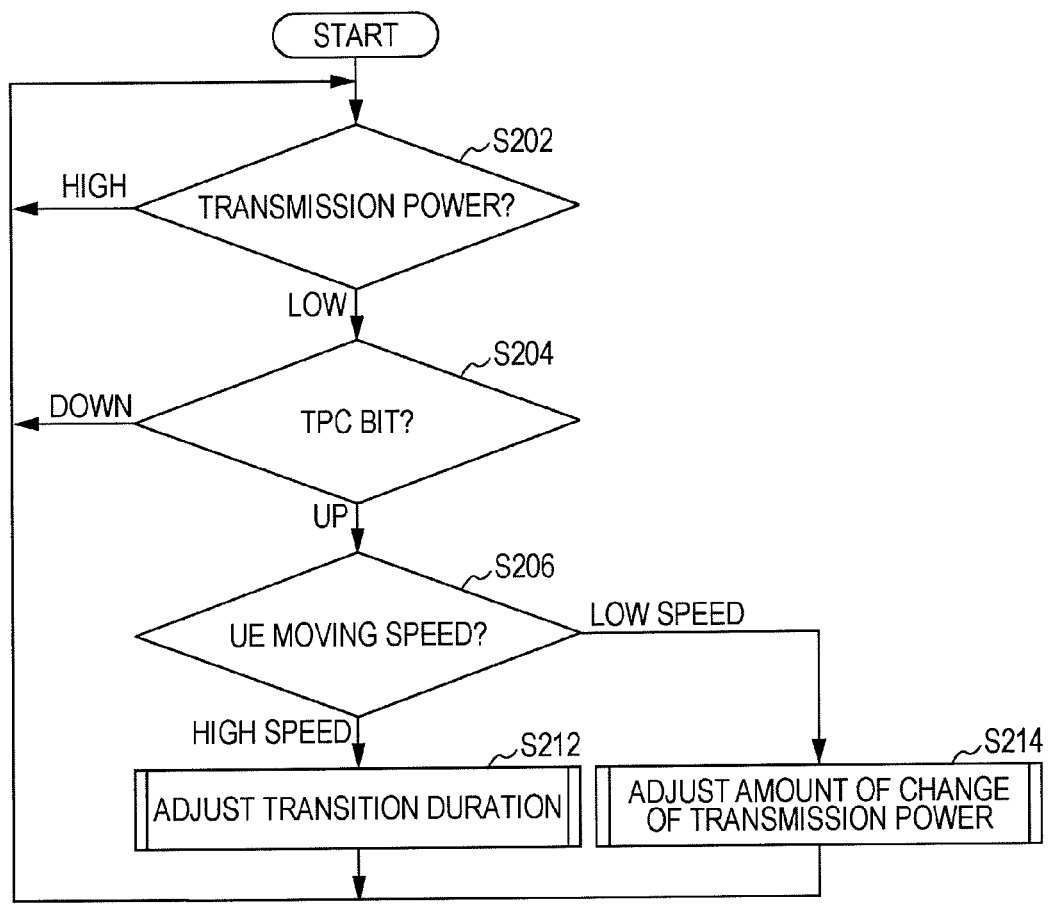
FIG. 14 illustrates an example of a flowchart for selection performed by monitoring a moving speed of a mobile station.

FIG. 14 is a diagram illustrating an example of a flowchart for selection performed by monitoring a moving speed of a mobile station.

The mobile station 300 compares its transmission power value with a previously set certain threshold value (S202). If the transmission power value of the mobile station 300 is less than the certain threshold value (S202; LOW), the mobile station 300 confirms a TPC Bit which has been transmitted from the base station 200 (S204). If the TPC Bit is an Up Bit (S204; UP), the mobile station 300 confirms its moving speed (S206)

The moving speed of the mobile station may be obtained in accordance with, for example, the time differential of position information obtained using a GPS (Global Positioning System) function installed therein, the time integral of a measured value of the acceleration of the mobile station obtained using an acceleration sensor installed therein, or the difference in the intensity of received power or received waves. As an alternative, the moving speed may be obtained from the base station 200.

If the moving speed of the mobile station is more than or equal to the previously set threshold value (S206; YES), the mobile station 300 adjusts a Transition Duration. The Transition Duration may be adjusted in accordance with any one of the above mentioned Transition Duration adjusting examples 1 to 4.

If the moving speed of the mobile station is high, the propagation path greatly fluctuates, so that it is desirable to adjust the Transition Duration while keeping the amount of change of the transmission power large. The reason lies in that if the amount of change of the transmission power is decreased, it may become harder for the base station 200 to receive a signal in some cases.

If the moving speed of the mobile station is less than the previously set threshold value (S208; NO), the mobile station 300 adjusts the amount of change of the transmission power (S214). The amount of change of the transmission power may be adjusted in accordance with the above mentioned example of adjusting the amount of change of the transmission power.

Step S202 and step S204 may be eliminated as the case may be.

(Example of a Flowchart for Selection by Monitoring UL-NACK and a Moving Speed of a Mobile Station)

Figure 15:
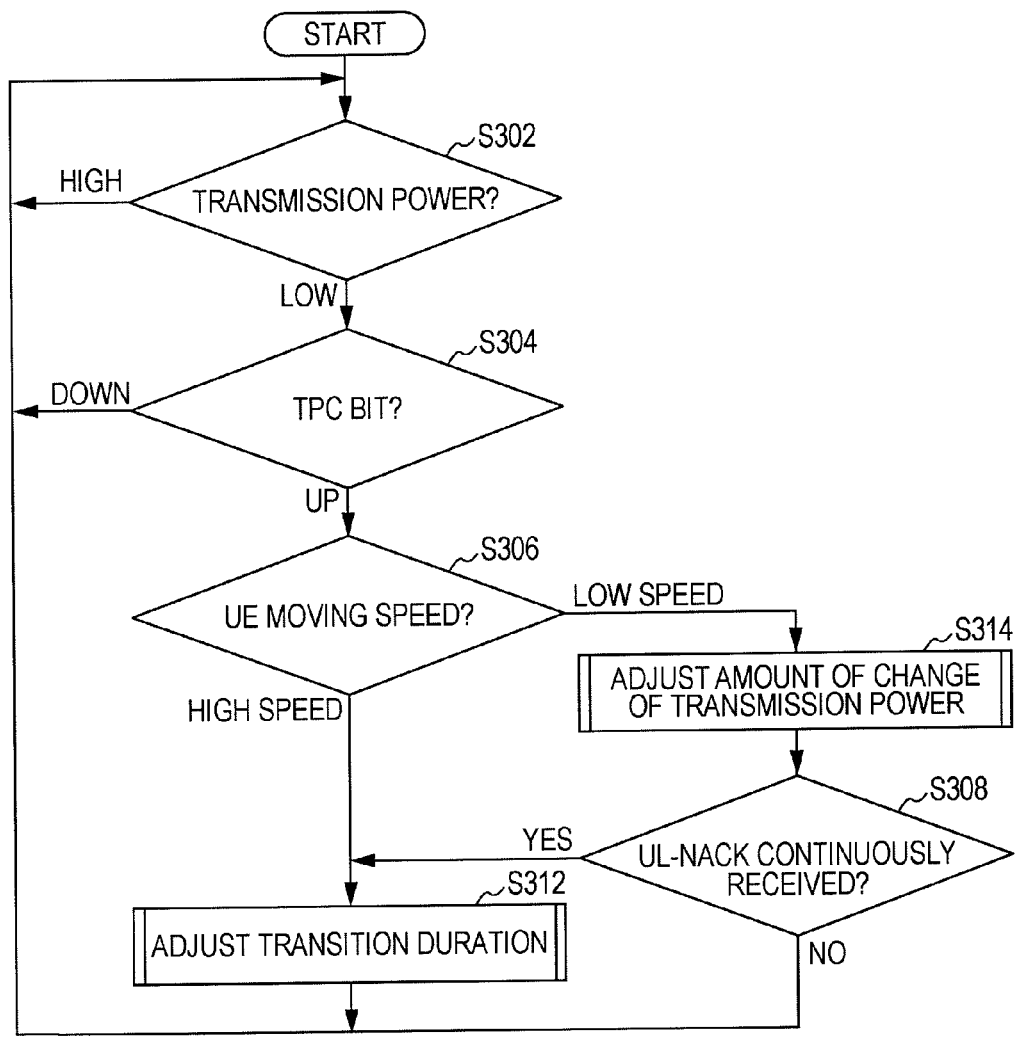
FIG. 15 illustrates an example of a flowchart for selection performed by monitoring an UL-NACK and a moving speed of a mobile station.

FIG. 15 is a diagram illustrating an example of a flowchart for selection performed by monitoring UL-NACK and monitoring a moving speed of a mobile station.

The mobile station 300 compares its transmission power value with a previously set certain threshold value (S302). If the transmission power value of the mobile station is less than the certain threshold value (S302; LOW), the mobile station confirms a TPC Bit transmitted from the base station 200 (S304). If the TPC Bit is an Up Bit (S304; Up), the mobile station confirms its moving speed (S306).

If the moving speed of the mobile station 300 is more than or equal to a previously set threshold value (S306; YES), the mobile station 300 adjusts the Transition Duration (S312). The Transition Duration may be adjusted in accordance with any one of the above mentioned Transition Duration adjusting examples 1 to 4.

If the moving speed of the mobile station 300 is less than the previously set threshold value (S308; NO), the mobile station 300 adjusts the amount of change of the transmission power (S314). The amount of change of the transmission power may be adjusted in accordance with the above mentioned example of adjusting the amount of change of the transmission power. Then, the mobile station 300 confirms as to whether the UL-NACK has been continuously received a previously set certain number of times (S308If the UL-NACK has been continuously received the previously set certain number of times (S308; YES), the mobile station 300 adjusts the Transition Duration (S312). The Transition Duration may be adjusted in accordance with any one of the above mentioned Transition Duration adjusting examples 1 to 4.

The reason why judgment of the moving speed of the mobile station 300 is performed before the Transition Duration is adjusted lies in that the moving speed of the mobile station is information which is most readily understood for estimating the state of propagation. In the example illustrated in FIG. 15, the propagation sometimes fluctuates greatly at a moving speed lower than a fixed speed, so that judgment of the moving speed of the mobile station is performed in combination with judgment as to whether the UL-NACK is continuously received as a relief measure to alleviate the large fluctuations of the propagation. In addition, when the mobile station is moved at a high speed, the fluctuations of the propagation may not decrease. Further, when the moving speed is high, the possibility that the UL-NACK is continuously received for the Transition Duration is low, so the judgment of the moving speed is performed first.

Step S302 and step S304 may be eliminated as the case may be.

According the embodiments of the present invention, it is possible to adapt to the change in transient response induced by the fluctuations of the transmission power and to increase the data transmission efficiency by varying the power transition amount in Transmission Power Control in accordance with the level of the transmission power value of the mobile station.

According to the embodiments of the present invention, it is possible to adapt to the change in transient response and to increase the data transmission efficiency by varying the length of the Transition Duration used depending on the level of the transmission power value.

According to the embodiments of the present invention, the requirement specifications for the Radio Frequency (RF) unit related to the transient response are loosened and hence the cost of components of the RF unit may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A mobile station device comprising:
a receiver configured to receive a control signal indicating that a transmission power of the mobile station device is increased or decreased, from a base station; and
a controller configured to increase or decrease the transmission power in accordance with the control signal, by a variation;
wherein the controller determines the variation to a first value when the transmission power has been more than a threshold value, and the controller determines the variation to a second value that is less than the first value when the transmission power has been less than the threshold value.

2. The mobile station device according to claim 1, wherein the control signal does not include the variation in the transmission power.

3. A mobile station device comprising:
a receiver configured to receive a control signal indicating that a transmission power of the mobile station device is increased or decreased, from a base station;
a transmitter configured to transmit a request signal to request a non-data-transmission period in which the mobile station does not transmit data to the base station in response to the control signal, the request signal including a set length of the non-data-transmission period; and
a controller configured not to transmit data in accordance with a response signal that is transmitted from the base station in response to the request signal;
wherein the set length is a first length when the transmission power has been less than a threshold value, and the set length is a second length that is shorter than the first length when the transmission power has been more than the threshold value.

4. A mobile station device comprising:
a transmitter configured to transmit a transmission power of the mobile station device to a base station device;
a receiver configured to receive a first control signal indicating that the transmission power of the mobile station device is increased or decreased, from the base station device, and a second control signal used to set a length of a non-data transmission duration in an uplink transmission; and
a controller configured to increase or decrease the transmission power of the mobile station device in accordance with the first control signal and setting the non-data-transmission duration in accordance with the second control signal used to set the length of the non-data-transmission duration.

5. A mobile station device comprising:
a receiver configured to receive a control signal indicating that a transmission power of the mobile station device is increased or decreased, from a base station device, and receive a confirmation response and a negation response regarding an uplink transmission between the mobile station device and the base station device;
a transmitter configured to transmit a request signal to request a non-data-transmission period in which the mobile station does not transmit data to the base station in response to the control signal, the request signal including a set length of the non-data-transmission period; and
a controller configured not to transmit data in accordance with a response signal that is transmitted from the base station in response to the request signal;
wherein the set length is a first length when the transmission power has been less than a threshold value, and the set length is a second length that is shorter than the first length when the transmission power has been more that the threshold value.

6. The mobile station device according to claim 5, wherein the transmitter is configured to transmit a request, to the base station device, that the non-data-transmission period in the uplink transmission be shorter than the set length if the transmission power of the mobile station device has been more than the threshold value when the receiver has received the control signal and continuously received the negation response a number of times.

7. The mobile station device according to claim 5, wherein the transmitter changes, if the transmission power of the mobile station device has been more than the threshold value when the receiver has received the control signal and has not continuously received the negation response a number of times, the transmission power by setting a variation of the transmission power for increasing or decreasing the transmission power; and if the transmission power of the mobile station device has been less than the threshold value, the control section changes the transmission power by making the variation of the transmission power smaller.

8. A mobile station device comprising:
a receiver configured to receive a control signal indicating that a transmission power of the mobile station device is increased or decreased, from a base station device; and
a transmitter configured to transmit a request signal to request a non-data-transmission period in which the mobile station does not transmit data, to the base station in response to the control signal, the request signal including a set length of the non-data-transmission period; and a controller configured not to transmit data in accordance with a response signal that is transmitted from the base station in response to the request signal;

wherein the set length is a first length when the transmission power has been less than a threshold value when the receiver has received the control signal and a moving speed of the mobile station device has been more than or equal to a predetermined speed, wherein the receiver receives a response including an instruction regarding the set length of the non-data-transmission period, to the request, and the controller sets the non-data-transmission period in accordance with the response.

9. The radio mobile station device according to claim 8, wherein if the transmission power of the mobile station device has been more than the threshold value when the receiver has received the control signal and the moving speed of the mobile station device has been more than the predetermined speed, the transmitter transmits a request, to the base station device, that the non-data-transmission period be shorter than the set length.

10. The mobile station device according to claim 8, wherein the controller changes, if the transmission power of the mobile station device has been more than the threshold value when the receiver has received the control signal and the moving speed of the mobile station device has been less than the predetermined speed, the transmission power by setting a variation of the transmission power for increasing or decreasing the transmission power; and if the transmitted power of the mobile station device has been less than the threshold value, the controller changes the transmission power by making the variation of the transmission power smaller.

11. The mobile station device according to claim 10, wherein the receiver receives a confirmation response and a negation response regarding uplink transmission between the mobile station device and the base station device, and the transmitter transmits a request, to the base station device, that, if the transmission power of the mobile station device has been more than the threshold value when the receiver has received the control signal and the moving speed of the mobile station device has been less than the predetermined speed and when the receiver has continuously received a negation response a number of times, the non-data-transmission period be shorter than the set length.

12. A base station device comprising:
a receiver configured to receive a request that a non-data-transmission period, in which a mobile station communicating with the base station device does not transmit data, be of a set length in an uplink transmission from the mobile station;
a controller configured to set the non-data-transmission period in the uplink transmission requested from the mobile station device; and
a transmitter configured to transmit a response to the request to the mobile station device.

13. A base station device comprising:
a receiver configured to receive a transmission power of a mobile station device from the mobile station device which is communicating with the base station device;
a controller configured to set a non-data transmission period in an uplink transmission to a set length if the transmission power has been less than a threshold value and setting the non-data-transmission period in the uplink transmission to be shorter than the set length if the transmission power has been more than the threshold value; and
a transmitter configured to transmit information on the length of the non-data-transmission period in the uplink transmission which has been set by the controller along with a control signal to the mobile station device.

* * * * *